US006797307B2

(12) United States Patent
Mälkki et al.

(10) Patent No.: US 6,797,307 B2
(45) Date of Patent: Sep. 28, 2004

(54) METHOD FOR PREPARING AN OAT PRODUCT AND A FOODSTUFF ENRICHED IN THE CONTENT OF β-GLUCAN

(75) Inventors: Yrjö Mälkki, Espoo (FI); Olavi Myllymäki, Espoo (FI); Kaija Teinilä, Yläne (FI); Seppo Koponen, Vantaa (FI)

(73) Assignee: Avena Oy, Helsinki (FI)

( * ) Notice: Subject to any disclaimer, the term of this patent is extended or adjusted under 35 U.S.C. 154(b) by 30 days.

(21) Appl. No.: 10/117,071

(22) Filed: Apr. 8, 2002

(65) Prior Publication Data

US 2003/0087019 A1 May 8, 2003

Related U.S. Application Data

(63) Continuation of application No. PCT/FI00/00887, filed on Oct. 13, 2000.

(30) Foreign Application Priority Data

Oct. 13, 1999 (FI) .............................................. 19992203

(51) Int. Cl.[7] .................................................. A23P 1/06
(52) U.S. Cl. ........................ 426/518; 426/481; 426/622
(58) Field of Search ................................ 426/518, 481, 426/483, 622

(56) References Cited

U.S. PATENT DOCUMENTS

| 4,028,468 | A |   | 6/1977  | Hohner et al. ............... 426/436 |
| 5,063,078 | A |   | 11/1991 | Foehse .......................... 426/618 |
| 5,106,640 | A |   | 4/1992  | Lehtomäki et al. ......... 426/436 |
| 5,169,660 | A |   | 12/1992 | Collins et al. ............... 426/271 |
| 5,183,667 | A |   | 2/1993  | Koch et al. .................. 424/474 |
| 5,183,677 | A |   | 2/1993  | Lehtomäki et al. ......... 426/436 |
| 5,312,636 | A |   | 5/1994  | Myllymäki et al. ......... 426/417 |
| 5,614,242 | A |   | 3/1997  | Fox .............................. 426/549 |
| 5,846,590 | A |   | 12/1998 | Mälkki et al. ............... 426/443 |
| 5,846,591 | A | * | 12/1998 | Satake et al. ................ 426/483 |

FOREIGN PATENT DOCUMENTS

| EP | 0 381 872   | 8/1990 |
| WO | WO 8901294 | 2/1989 |

OTHER PUBLICATIONS

Food and Drug Administration, "Food Labeling: Health Claims; Oats and Coronary Heart Disease; Final Rule," Federal Register, vol. 62, No. 15, pp. 3583–3601, Jan. 23, 1997.
Beer, Mu et al., "Effects of oat gum on blood cholesterol levels in healthy young men," European Journal of Clinical Nutrition, vol. 49, pp. 517–522, 1995.
Bhatty, R.S., "Laboratory and Pilot Plant Extraction and Purification of β–Glucans from Hull–less Barley and Oat Brans," Journal of Cereal Science, vol. 22, pp. 163–170, 1995.
Braunschweig, K.. Vorwerck., "Hafermahlprodukte mit erhöhtem Ballaststoffgehalt," Getreide Mehl Brot, vol. 9, pp. 265–267, 1990.
Doehlert, Douglas C. et al., "Composition of Oat Bran and Flour Prepared by Three Different Mechanisms of Dry Milling," Cereal Chem. vol. 74, No. 4, pp. 403–406, 1997.

Handreck, B. et al.,"β–Glucananreicherung in Gerstenmahlprodukten durch Prallvermahlung," Getreide Mehl und Brot, vol. 51, No. 3, pp. 158–161, 1997.
Knuckles, B.E. et al., "β–Glucan–Enriched Fractions From Laboratory–Scale Dry Milling and Sieving of Barley and Oats," Cereal Chem. vol. 69, No. 2, pp. 198–202, 1992.
Mälkki, Yrjö et al., "Oat Bran Concentrates: Physical Properties of β–Glucan and Hypocholesterolemic Effects in Rats," Cereal Chem. vol. 69, No. 6, pp. 647–653, 1992.
Shinnick, Fred L. et al., "Oat Fiber: Composition Versus Physiological Function in Rats," Journal of Nutrition, vol. 118, pp. 155–151, 1988.
Shinnick, Fred L. et al., "Dose Response to a Dietary Oat Bran Fraction in Cholesterol–Fed Rats," Journal of Nutrition, vol. 120, pp. 561–568, 1990.
Tappy, L. et al., "Effects of Breakfast Cereals Containing Various Amounts of β–Glucan Fibers on Plasma Glucose and Insulin Responses in NIDDM Subjects," Diabetes Care, vol. 19, No. 8, pp. 831–834, 1996.
Törrönen, R. et al., "Effects of an Oat Bran Concentrate on Serum Lipids in Free–Living Men With Mild to Moderate Hypercholesterolaemia," European Journal of Clinical Nutrition, vol. 46, pp. 621–627, 1992.
Uusitupa, Matti IJ et al., "A Controlled Study on the Effect of Beta–Glucan–Rich Oat Bran on Serum Lipids in Hypercholesterolemic Subjects: Relation to Apolipoprotein E Phenotype," Journal of the American College of Nutrition, vol. 11, No. 6, pp. 651–659, 1992.
Wood, Peter .J. et al., "Extraction of High–Viscosity Gums From Oats," Cereal Chem. vol. 55, No. 6, pp. 1038–1049, 1978.
Wood, Peter J. et al., "Large–Scale Preparation and Properties of Oat Fractions Enriched in (1→3)(1→4)–β–D–Glucan," Cereal Chem. vol. 66, No. 2, pp. 97–103, 1989.
Wu, Y. Victor et al., "Enriched Protein– and β–Glucan Fractions From High–Protein Oats by Air Classification," Cereal Chem. vol. 72, No. 1, pp. 132–134, 1995.

* cited by examiner

*Primary Examiner*—George C. Yeung
(74) *Attorney, Agent, or Firm*—Morgan, Lewis & Bockius LLP

(57) ABSTRACT

The invention relates to a method for preparing an oat product enriched in the content of β-glucan as well as a method for preparing a foodstuff incorporating such an enriched oat preparate. The invention uses dehulled or naked oats, which are subjected to dry milling and dry fractionation at multiple stages without a preceding removal of fat. The oat material is at a first stage subjected to dry milling and dry classification to separate a coarser fraction containing grain cell wall material and starch containing subaleurone layer as a pre-enriched fraction from a finer, endosperm containing fraction. At a second stage said pre-enriched fraction is subjected to dry milling, where the disintegraing action is more effective than at the first stage, and to dry classification for separating a coarser, cell wall material containing fraction as the enriched product from a finer, starch containing fraction. The dry milling may be constituted by roller or impact milling, and the dry classification may be sieving or air classification. The foodstuff containing the enriched oat preparate may be a cereal, meat, ready-to-eat meal, drink or candy product.

24 Claims, 1 Drawing Sheet

METHOD FOR PREPARING AN OAT PRODUCT AND A FOODSTUFF ENRICHED IN THE CONTENT OF β-GLUCAN

This is a continuation of International Application No. PCT/FI00/00887, with an international filing date of Oct. 13, 2000.

FIELD OF THE INVENTION

The object of the invention is a method for enriching β-glucan in products obtained from dehulled or naked oats. More specifically, the object of the invention is the method for preparing an oat product enriched in the content of β-glucan, in which method dehulled or naked oats are subjected to dry milling and dry fractionation at multiple stages. A further object of the invention is the use of such product as a component in foodstuffs such as cereal, meat, candy, beverage, or prepared meal products.

BACKGROUND OF THE INVENTION

As it has been shown in numerous animal and clinical studies, ingesting soluble dietary fibre such as oat β-glucan causes a reduction in blood total and low-density lipoprotein cholesterol content, which in turn reduces the risk of coronary heart disease. The principal mechanism of this action is according to the present view a reduction of the back absorption of bile acids in the small intestine, which lead to their increased excretion in the faeces, and correspondingly to their increased synthesis from cholesterol. Simultaneously, soluble fibre retards and weakens also the absorption of glucose in the small intestine, which leads to a diminished secretion of insulin. Consequently, synthesis of cholesterol, which is promoted by insulin, is weakened. The said retarding of the absorption of glucose is of advantage for diabetic patients or for persons having a weakened glucose tolerance. This offers them a possibility to reduce the post-meal elevation of glucose and a later hypoglycemic condition. Correspondingly, controlling fluctuations in blood glucose level is also of advantage for improving the prestation of sportsmen and in long-duration exercise. Weakening of the glucose absorption has been shown to be effected by the increased viscosity in the small intestine. There are also indirect but no direct proofs of the dependence of the reduction of cholesterol on the viscosity.

In addition to these effects, soluble dietary fibre has been shown to have several other health-promoting effects, such as alleviating several disorders of the intestine, diminishing risks of hormone mediated cancers, and in composing weight reduction diets especially in improving the control of appetite.

The use of cereal soluble fibre for functional foods has so far been limited mainly to breakfast cereals and to certain bakery products. For achieving a significant reduction of cholesterol, the daily intake of β-glucan has to be at least 3 g (Department of Health and Human Services, USA, Federal Register 62, 3584–3601, 1997). For controlling fluctuations of blood glucose and insulin, the amount of β-glucan needed is 5 to 6 g per meal (Tappy et al., Diabetes Care 19, 831–834, 1996). In addition to the amount, it is important that β-glucan is sufficiently rapidly soluble and elevates the viscosity efficiently. Obtaining the minimal daily amount of β-glucan needed for reduction of cholesterol has been possible using commercial ingredients available so far, but the amounts of oat products to be ingested daily have been so high, that only few persons can be persuaded to follow such diets regularly or for long periods. Balancing fluctuations of blood glucose and insulin by using β-glucan is not possible without a remarkable concentration of β-glucan from the level present in native oat grains and traditional oat products.

The content of β-glucan in commercially cultivated oats is usually within the limits 2.5 to 4.5%, but can in exceptional lots be up to 5.5% of the dry weight. Oat bran produced using traditional milling and sieving techniques contains β-glucan usually 5.5 to 7%, but can exceptionally contain up to 10% from the dry weight. Achieving higher contents by using dry milling methods is said to be limited by the soft structure and the fat content of oat grains. In scientific research papers there are reports of samples prepared using dry fractionation methods and having β-glucan contents from 10.3 to 12.8% (Shinnick et al, Journal of Nutrition 118, 144–151, 1988, Shinnick et al., Journal of Nutrition 120, 561–588, 1990, Wood et al, Cereal Chemistry 66, 97–103, 1989, Doehlert and Moore, Cereal Chemistry 74, 403–406, 1997), but commercial production of such products has not succeeded.

In most of the research papers on dry milling concentration, the milling has been performed in one stage, after which the milled product has been fractionated by sievings and/or air classifications. Thus in the said publication of Wood et al., one stage pin milling has been used, followed by air classification with a capacity of 105 kg/h. They obtained a concentrate containing 12.8% β-glucan with a yield of 34%, but reported a partial blocking of the equipment after handling a lot of 468 kg. As compared to the starting material, a 2.29-fold concentration of β-glucan was achieved. Doehlert and Moore used a laboratory scale roller mill and obtained after two sieving stages a concentrate containing 11% β-glucan, with a yield of 22.3%. Using impact type milling they obtained with a yield of 27.4% a concentrate having a β-glucan content of 8.85%.

Dry milling in one to two stages has been used by Myllymäki et al. (U.S. Pat. No. 5,312,636), as the first step in their method for solvent wet milling fractionation. The content of β-glucan obtained after the dry fractionation stage was 11–12%. Vorwerk (Getreide, Mehl und Brot 1990, 265–267) reported of concentration using three subsequent roller milling and sieving operations. The study has evidently been made in pilot scale, and no details have been disclosed. A concentrate containing 23% of total dietary fibre, corresponding to 11.5% β-glucan, was obtained with a yield of 15%.

A more advanced concentration of β-glucan is possible after removing fat with an organic solvent (Wood et al, Cereal Chemistry 66, 97–103, 1989, Knuckles et al., Cereal Chemistry 69, 198–202, 1992, and Wu and Stringfellow, Cereal Chemistry 72, 132–134, 1995), followed by dry milling and fractionation operations, or by wet milling in an organic solvent (Myllymäki et al., U.S. Pat. No. 5,312,636, Wood et al., Cereal Chemistry 66, 97–103, 1989, Collins et al., U.S. Pat. No. 5,169,660, Mälkki and Myllymäki, U.S. Pat. No. 5,846,590), or by wet milling in cold water (Lehtomäki et al., U.S. Pat. No. 5,106,640). U.S. Pat. No. 5,183,667 has been granted for an oat fibre concentrate containing 15 to 40% of β-glucan. For the method of production, wet milling in cold water which may contain ethanol has been given.

For isolation of purified β-glucan, alkaline extraction followed by various purification stages and final precipitation of β-glucan by ethanol or ammonium sulfate have been used (Hohner and Hyldon, U.S. Pat. No. 4,028,468, Wood et al., Cereal Chemistry 55, 1038–1049, 1978, Myllymäki et al, U.S. Pat. No. 5,312,636, Collins et al., U.S. Pat. No.

5,169,660, Bhatty, Journal of Cereal Science 22, 165–170, 1995). The purity achieved in technical or pilot scale has been 60–80%.

As a drawback for the said methods using organic solvents is the elevation of processing costs, which limit the economical use of these fibre concentrates in food products. Also using the cold water wet milling involves considerable costs of drying the products, and in addition, in animal and clinical studies performed so far the cholesterol reducing effect of the product obtained has been weaker than with products prepared by dry milling methods (Mälkki et al., Cereal Chemistry 69, 647–653, 1992, Uusitupa et al, Journal of the Americal College of Nutrition 11, 651–659, 1992, T örrönen et al., European Journal of Clinical Nutrition 46, 621–627, 1992). In several studies it has been found, that in the isolation of β-glucan its molecular weight and viscosity are reduced (Wood et al., Cereal Chemistry 66, 97–103, 1989), which can lead to a complete loss of the cholesterol reducing effect (Beer et al, European Journal of Clinical Nutrition 49, 517–522, 1995). Health claims connected with β-glucan are in the United States allowed so far only regarding reduction of cholesterol and reducing the risk of coronary heart disease, and only when using wholemeal oat products or oat bran, which have been produced using dry milling and separation techniques.

SUMMARY OF THE INVENTION

According to this invention it has now been surprisingly observed, that oat β-glucan can be concentrated using dry milling and separation methods also in industrial scale to higher concentrations than the said 10% achieved in the industrial scale using traditional methods. The essential characteristic of the invention based on said observations are presented in the claims attached.

The method according to this invention involves a selective milling, which is performed in two main stages. In the first main stage, the milling conditions are selected with the purpose to preserve as far as possible the integrity of the outer layers of the dehulled grains, whereby the endosperm which has a high content of starch is separated as a fine powder. The coarse fraction obtained from this main stage is a preconcentrate, which is treated further in the second main stage by using more effective impact, shear or roller operations. This enables to separate the main part of the starch of the subaleurone layer from the cell wall constituents. Separation of the coarse and fine fractions can be effected either by sievings including air flushed sieves, by air classifying, or these operations after each other. Critical stages of the process are connected partly to milling, partly to separation stages.

DETAILED DESCRIPTION OF THE PREFERRED EMBODIMENTS

Figure 1:
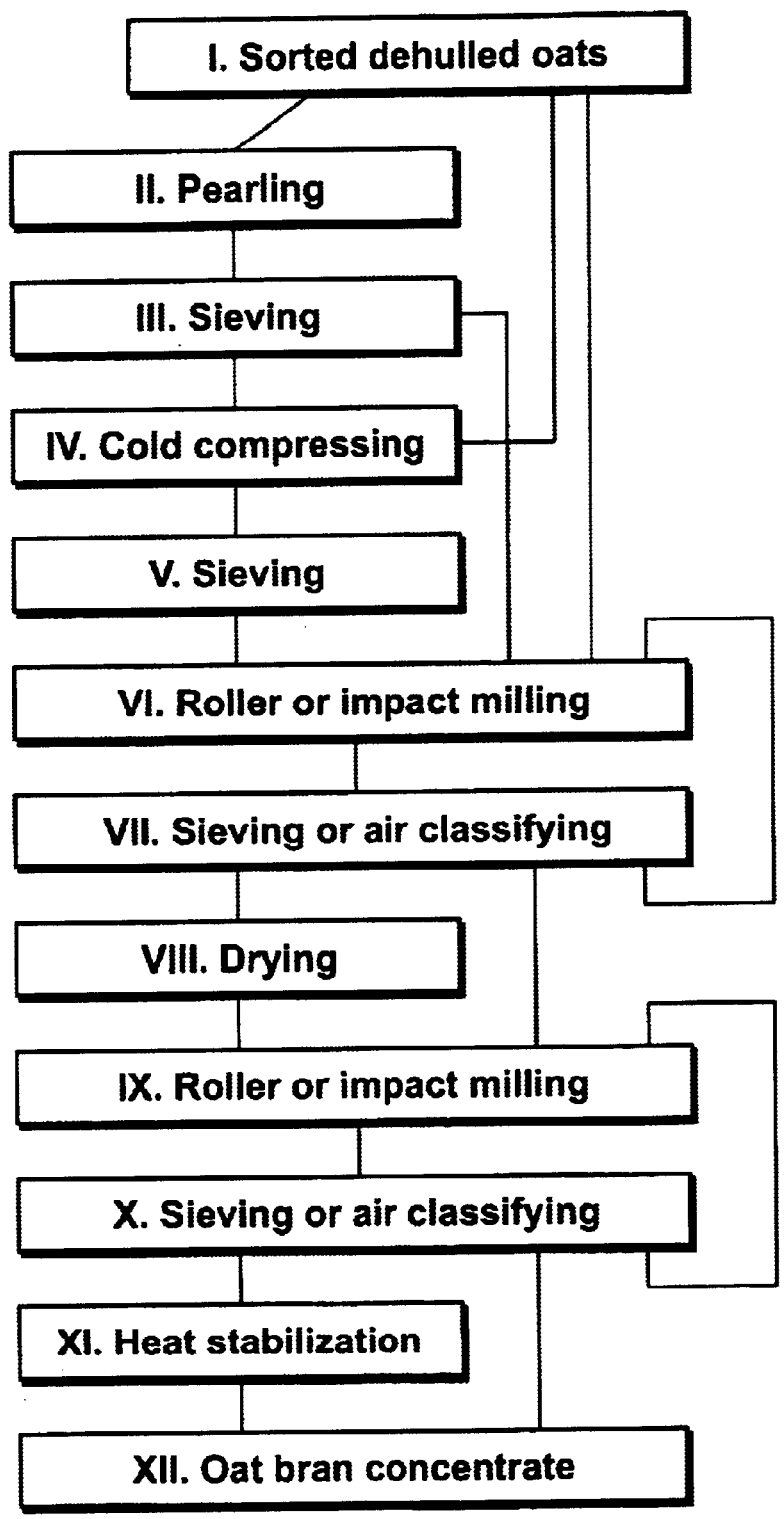
FIG 1 is a flow chart describing the process of the invention.

In the Figure attached, to which references are made in the following, the method for the preparation of an oat product according to the invention is presented as a flow sheet. In addition to the essential steps of the invention, it also includes some operations for applicating the invention, which are optional. The figure shall not be understood as limiting the invention as such.

Raw material (I) used in the method is either dehulled oats or naked oats. This means that impurities, seeds of other plants, under-developed and small-sized grains are removed in sorting operations, after which the grains have been dehulled, unless naked oats are used. The dehulled raw material for the process can be either heat-treated or not heat treated. No removal of fat from the oat material is required. Before the first main milling stage, the grains can be treated by removing superficial layers by pearling (II), in order to reduce the proportion of insoluble fibre and/or colouring substances. The proportion to be removed can be 10–20%, and it is then separated by sieving (III).

Before the main milling stages it is advantageous to open the structure of the dehulled grains by compressing or gently chafing treatments (IV), performing it using smooth or slightly corrugated rollers with no or only slightly differing velocities. The equipment, feed rate, clearance between the rolls, and running speeds have to be selected in such a way that heating of the grains at this stage remains minimal. The product obtained is led to sieving (V), using e.g. sieves with openings of 500 $\mu$m. The fine fraction separated consists mainly of endosperm, amounts to 5–20% of the amount fed, and its content of β-glucan is usually within the limits 0.7–1.2%. This stage can be bypassed in cases, for example, when soft-grained oats are treated.

The coarse flaky fraction or alternatively non-compressed dehulled grains are now led to the first main milling stage (VI). This can be performed with corrugated rollers operated with a higher disintegrating effect than the previous treatment, with impact devices, or by combining impact and shearing effects. For example, the said combination can be performed by causing an impact of the particles to be treated against a surface which has a shearing profile, such as a mesh or collar screen with sharp edged openings, or a surface with a sharp-edged profile. Whichever of these alternatives is used, the milling conditions have to be selected in a way to minimize the heating of the material to be treated and the mechanical damage of the starch granules.

In the sieving or classification (VII) following this milling, a fine fraction is separated, having usually a β-glucan content in the range 0.7–3.1%, preferentially below 1.5% of the dry matter. When a sieving operation is selected, the sieve openings can be from 100 to 330 $\mu$m, preferentially 180–230 $\mu$m. When operating by air classification, the cut-off can be adjusted in a way, that in the fine fraction more than 75% of the particle volume consists of particles smaller than 200 $\mu$m in diameter. The yield of the fine fraction depends on the disintegration efficiency of the preceding milling. The coarse fraction obtained can be retreated once or several times by a similar milling and sieving or air classification, when less than 50% of the feed is separated in the fine fraction.

The coarse fraction from the first main milling stage still contains starch, of which a great part is in the subaleurone layer. A prerequisite for the further concentration of the soluble dietary fibre is to separate the main part of this starch, which is possible only by treatments reducing further the particle size. It is advantageous to perform this treatment at a lower moisture content than the previous main stage, in order to get the cell wall material more fragile, which both enhances the milling and improves the separation of starch. This is usually possible without any separate drying operation, especially when the first milling, sieving, air classification and material transport stages are performed using great amounts of air, which causes a drying of the cereal material. In other cases it is advantageous to perform an intermediary drying (VIII). The moisture content of the material to be milled is after these stages advantageously below 11%, preferably from 8 to 10%.

In the following second main milling stage (IX), the material is disintegrated by using more effective impact or roller operations than at the first main milling stage. The said more effective action is achieved in impact type mills by increasing the rotor tangential speed, by changing the clearance between the rotor and the periferial surface, by changing the feeding rate and/or the size of exit openings: In roller operations it can be effected by using rollers with deeper corrugations and/or a higher difference in the speed of the rollers. In both of these operation types, removal of the fines before the next milling stage improves the effect of impact, since the soft material in the fines can damp the impact force. It has to be noticed, that the effects of the factors mentioned can be interdependent. Thus adjusting the feeding rate can either enhance or diminish the disintegration effect depending on its ratio to the size of exit openings. The comminuted mixture is now led to sieving, air-flush sieving or air classification operations (X) for the removal of the fine starchy fraction from the cell wall material. When sieving is used, sieve openings of 90 to 250 $\mu$m, preferably 100 to 180 $\mu$m can be used. When air classification is used, the cut-off can be adjusted in a way to yield a fine fraction with more than 75% of the total volume consisting of particles with a diameter less than 125 $\mu$m. Due to the effective disintegration, also a part of the cell wall material is broken into small particles and ends up to the fine fraction. For this reason, $\beta$-glucan content of the fine fraction of the second stage is usually elevated to 4–8%, but can in exceptional batches can be up to 11%. Such batches can however be reclassified to improve the total yield of the dietary fibre concentrate and $\beta$-glucan.

The content of $\beta$-glucan in the final coarse fraction has been 12 to 19% of the dry matter, when oat cultivar varieties available presently have been used. In case a desired content of $\beta$-glucan is not achieved, the coarse fraction can be remilled and reclassified. On the basis of the concentration effect obtained it can be calculated, that when new cultivar varieties or improved cultivation practices yielding higher initial content of $\beta$-glucan are available, concentrates containing up to 25% of $\beta$-glucan can be prepared using this method.

In case the raw material has not been heat treated before the millings and classifications, the concentrate containing soluble dietary fibre has to be heat stabilized (XI) to inactivate enzymes weakening the storage stability. This can be performed, for example, by fluidized bed heating, or by cooking extrusion. Advantages of the latter type of treatment are a possibility to use higher temperatures under pressure, and consequently a more rapid and effective inactivation, and the mechanical treatment involved, which elevates the solubility of $\beta$-glucan when the parameters are properly chosen. The parameters influencing are temperature, pressure, moisture content, residence time, and mechanical treatment. A minimal requirement for their combined action is a complete inactivation of the enzyme tyrosinase. A maximal treatment is a combination which leads to a slight weakening of the viscosity properties.

The heat treatment can also be combined to a preparation of a consumer product, for instance by mixing other components to the concentrate containing soluble fibre, and extruding this mixture, to yield for example breakfast cereals or intermediate products for different purposes.

For achieving the goals of the process, it is important that the outer layers of the grain, where in most of the oat cultivar varieties the main part of $\beta$-glucan is located, are in the pretreatments and in the first main milling stage maintained intact in their cellular structure. As it is known from wheat milling, grains can be preconditioned to a suitable moisture content before the first main milling stage by using methods known as such. In the study of Doehlert and Moore mentioned above, a short duration, for example 20 minutes, preconditioning at room temperature led to an optimal separation of oat bran. The optimal moisture content found by these authors was 12%. However, the essential factor is the moisture content of the outer layers of the grain. In a preconditioning, the water content is immediately distributed unevenly between the outer layers and the endosperm.

At the milling, sieving and air classification stages, problems are easily encountered from clogging and fixing of material on the walls of the equipment, sieves and pipelines. In roller mills this often causes filling the grooves of the rollers, in impact type mills fixing the material in the pins, on the perifery and at the outlet of the milling chamber, and in the pipelines at the bendings of the pipe or its surfaces. In the sieving it often causes formation of ball-shaped agglomerates which do not pass the sieve and thus enter into the coarse fraction although consist principally of fine material. Also clogging of the sieves, both on the upper and lower surface, occurs. In air classification this causes blocking the outlet channels and accumulation of fine material on horizontal surfaces in places where the local air velocity is relatively lower, and when these accumulations grow in size, they are loosened and enter in the coarse fraction diluting it and making it inhomogenous.

The most important influencing factors for clogging and adhesion, in addition to the constructional details of the equipment, have been found to be the humidity of the air, the total and surface humidity of the cereal material, and the extent of damage or gelatinization of the starch particles. In mechanical treatments such as milling the heat generated causes local elevations of temperature in the material leading to evaporation of water, which later is condensed. This causes agglomeration of particles and their adsorption and fixing to each other and to the surfaces of the equipment, especially when the material contains starch which has exuded from the granules or is gelatinized. To control this phenomenon, generation of heat or transfer of heat into the material to be treated has to be minimized consistently at all stages of milling and classifying operations. Furthermore, removal of water vapor has to be facilitated with the aid of sufficient flow of dry air, condensing has to be minimized by minimizing local temperature differences, and adhesion to surfaces by avoiding sharp bends in air and material flow. Damaging of starch granules has to be minimized by selecting the equipment and processing conditions by preferring impact, pressing and chafing operations with minimizing shearing actions as far as possible.

Implementation of the method and applications of the product are described in the following examples. In addition to the applications described, further applications derived from these are, among others, ready-to-eat foods, dry mixes for baking, and biscuits. For downstream treatment of extruded products can known treatments such as roller pressing, figure-profiled orifices, and coextrusion be used.

EXAMPLE 1

Dehulled, size-sorted oats of four cultivar varieties were preconditioned to 10% moisture and pearled using a Schule Carborundum equipment. Amount of the surface layer separated varied from 19 to 21%. Pearled grains were ground in three subsequent passages with a Brabender Quadrumat laboratory scale roller mill, and sieved with a rotating sieve with openings of 500 $\mu$m. The coarse fraction of the last passage was 28% of the feed, and its β-glucan content was 8.4%. Samples of the same pearled batches were also ground using one passage in the roller mill followed by two passages in an impact mill. Sieving was performed using a laboratory scale air flushed sieve with openings of 0.1 mm. The yield of the coarse concentrate fraction varied from 24 to 27% of the feed. The following concentration of β-glucan was achieved:

| Cultivar variety | β-Glucan (%) in the pearled grains | β-Glucan (%) in the concentrate | Concentration factor |
|---|---|---|---|
| Nasta | 5.7 | 13.4 | 2.35 |
| Vouti | 4.4 | 11.6 | 2.64 |
| Tiitus | 4.2 | 13.3 | 3.17 |
| Stil | 5.6 | 12.3 | 2.20 |

EXAMPLE 2

Dehulled and size sorted oats were compressed without preceding heating between two smooth rolls to a thickness of 0.7 mm. The compressed product was ground using an impact type mill with a tangential speed of the rotor of 71 m s$^{-1}$, and a collar screen with sharp-edged wire net. The feed rate was 180 kg/h. The milled product was sieved using a cylindrical vertical sieve fitted with impact paddles, and with sieve openings of 223 μm. The coarse fraction was retreated twice. The coarse product from the last sieving had a β-glucan content of 13.4% of dry matter.

EXAMPLE 3

Dehulled oats with an initial β-glucan content of 5.14% of dry matter and an initial moisture of 12.4% were ground in an impact type mill with a tangential speed of the rotor of 120 m s$^{-1}$, and openings of the collar screen of 3 mm. Feeding rate was 600–700 kg/h, and the air flow through the mill 50 m$^3$ h$^{-1}$. The ground product was air classified using in the return impeller a rotor speed of 680–700 rpm. The yield of coarse fraction was 38% of the feed, its content of β-glucan varied from 10.5 to 12.5%, with an average of seven experimental batches of 11.4%. Content of β-glucan in the fine fraction varied from 1.5 to 2.0% of dry matter, with an average of three batches of 1.6%. The coarse fraction obtained had a moisture content of 10.5%. It was reground using the same mill, rotation speed and air flow, but with a feed rate from 330 to 390 kg h$^{-1}$, and with collar screen openings of 1 mm. The milled product was air classified using a return impeller rotor speed of 660 rpm. The coarse fraction was 56% of the feed at this stage, corresponding to 21.3% of the original feed. Its β-glucan content varied from 16.6 to 17.0% of dry matter, with an average of three samples of 16.9% of dry matter. The calculated concentration factor for β-glucan was 3.29. The content of β-glucan in the fine fraction from the second classification was 7.2%, as an average of four samples.

EXAMPLE 4

Oat batch corresponding to that used in Example 3 was ground as described in Example 2, and sieved using a vibration sieve with openings of 223 μm. The content of β-glucan in the coarse fraction was 8.8% of the dry matter. This fraction was now ground and classified following the conditions of the second stage of Example 3. The content of β-glucan in the coarse fraction was 14.8% of dry matter, in the fine fraction of the second stage it was 5.3% of dry matter.

EXAMPLE 5

Dehulled and heat treated oats of two cultivar varieties were ground at consecutive steps in an impact type mill fitted with a paddle-type rotor and a profiled periferium of the milling chamber. Ambient air temperature was 16° C., the relative humidity 65%. After grinding the product was air classified, the classifier was adjusted to give a coarse fraction with less than 10% of weight consisting particles smaller than 125 μm in the first passage, and in the second and subsequent passages less than 5% of weight of particles smaller than 125 μm. Other conditions and results are given in Table 1.

TABLE 1

Dry milling and classification of dehulled heat inactivated oats of two cultivar varieties

| Variety | Step | Moisture at start, % | Feed kg/h | Tangential speed, m/s | Clearance mm | % over 0.5 mm in coarse | Beta-glucan % dry matter | | | Yield coarse kg/100 kg | Yield beta-glucan | |
|---|---|---|---|---|---|---|---|---|---|---|---|---|
| | | | | | | | Start | Coarse | Fine | | kg/100 kg | % of feed |
| Yty | 1 | 12.6 | 1900 | 108 | 7 | 52.9 | 5.2 | 9.2 | | 43 | 3.51 | 77.3 |
| | 2 | 11.2 | 1900 | 108 | 7 | 37.8 | 9.2 | 12.0 | 3.1 | | | |
| | 3 | 10.4 | 1900 | 108 | 7 | 19.3 | 12.0 | 14.1 | 7.3 | | | |
| | 4 | 10.0 | 1000 | 108 | 5 | 14.3 | 14.1 | 16.6 | 9.8 | 16.9 | 2.52 | 55.4 |
| Roope | 1 | 12.6 | 1500 | 110 | 5 | 36.1 | 5.3 | 11.3 | 2.9 | 28 | 2.82 | 60.4 |
| | 2 | 10.8 | 1500 | 115 | 5 | 7.9 | 11.3 | 15.2 | 7.9 | 9.3 | 1.28 | 27.3 |

The grinding or disintegrating effect was enhanced by lowering the feeding rate and diminishing the clearance from step 3 to step 4 of the milling sequence for the variety Yty and by enhancing the rotor tangential speed from step 1 to step 2 for the variety Roope.

The results indicate that concentration of β-glucan is possible to perform in a wide range of processing conditions, but the yield of the coarse fraction and the yield of β-glucan into this fraction depend on the conditions selected.

EXAMPLE 6

Concentrate according to Example 2 was extruded using a Clextral BC-10 twin-screw cooking extruder using a feed rate of 120 g min$^{-1}$, a screw velocity of 57 rpm, varying the barrel temperature from 100 to 120° C., and the moisture content of the mixture from 10 to 21%. Extrusion was performed both using orifices at the discharge and without orifices. Determination of tyrosinase activity did not show any residual activity in noticeable amounts. For determining viscosity, 4,7 g of product samples were suspended in 80 ml of a phosphate buffer of pH 7.0, and 8.5 mg trypsin was added. The mixture was incubated in a shaking water bath at 37° C. The calculated content of β-glucan of the mixture was 0.7%. Viscosity was measured using a Bohlin Visco 88 viscometer. After incubation of one hour viscosities of the suspensions, as measured using a shear rate of 23 $s^{-1}$ varied from 210 to 480 mPa s. The results show that β-glucan in these samples has had viscosity properties comparable to non-concentrated oat samples which have been heat treated. The highest viscosities were observed in samples where the moisture content in the extrusion was 10%, and the lowest when the moisture content was 18–21%. Variation of drum temperature within the said limits and the use of orifices had minor effects as compared to water content.

EXAMPLE 7

Concentrate according to Example 2 was extruded in a Clextral BC-72 extruder with a feed rate of 250 kg $h^{-1}$ and using an orifice and cutter at the discharge, but otherwise under conditions corresponding to those presented in Example 6. The product obtained was dried with hot air flow. When viscosity properties were measured according to Example 5, the viscosity of a suspension containing 0.7% β-glucan was after 15 min 165 mPa s, and after 60 min 444 mPa s.

EXAMPLE 8

Concentrate according to Example 2 was mixed in dry state with 1% of cinnamon powder, and the mixture was extruded under conditions described in Example 7. The producct obtained was as such applicable as breakfast cereal, used with milk or yoghurt. In a clinical experiment with patients having Type II diabetes mellitus, the product diminished post-prandial elevation of blood glucose and insulin, as compared to a breakfast cereal containing wheat bran.

EXAMPLE 9

Concentrate according to Example 2 was mixed in dry state with 0.2% Acesulfam K non-caloric sweetener (Sunett, Hoechst), 0.8% of orange granulate, and 0.4% of honey powder. The mixture was extruded under conditions given in Example 7, the product was air-dried and ground. When one part of it was mixed with 10 parts of fruit juice, a nectar-type drink was obtained in a few minutes. This drink was drinkable during about 5 minutes, after which it formed a jelly-like consistency. A rapid elevation of viscosity is a desirable property, since it enhances the physiological effects in applications which are viscosity-dependent.

EXAMPLE 10

Seventy-seven parts of the concentrate according to Example 2 were mixed with 20 parts by weight of orange concentrate and 3 parts of fructose, and the mixture was extruded under conditions given in Example 7. The soft granules obtained were applicable for preparing candies, for instance of snack type products. The β-glucan content of the granules was 10.7%.

EXAMPLE 11

Using extruded concentrate according to Example 7, wheat buns were prepared with the following proportions of ingredients:

500 parts water
135 parts extruded oat bran concentrate having a β-glucan content of 13.0% of freh weight
260 parts wheat flour
50 parts non-fat dry milk
16 parts brown sugar
50 parts rapeseed oil
5 parts salt
11 parts dry yeast Salt and brown sugar were dissolved in water of 40° C. Oat bran concentrate was mixed with non-fat dry milk and dry yeast, the mixture was added into water and blended. Wheat flour was battered into the dough, and finally the oil. The dough was allowed to proof at room temperature for 50 min. Buns of 57 g were formed, and baked at 225° C.

In sensory evaluation the buns had a good volume, the structure was soft, the taste was oat-like and was evaluated good. The average weight after baking was 44 g, and the content of β-glucan was as a mean 0.96 g in each. Viscosity as measured under conditions simulating the small intestine corresponded to that of the extruded ingredient as measured under similar conditions. The viscosity as measured after 60 min dissolving time was not changed when the buns were stored in refrigerator for 4 days, or in a home freezer for 10 days.

EXAMPLE 12

Using oat bran concentrate with 14% β-glucan, prepared according to Example 2, meat balls were prepared using the following ingredients and proportions:

200 parts minced pork and beef
180 parts water
19.1 parts oat bran concentrate
15.3 parts potato starch
12 parts breadcrumb
3.1 parts salt
2.4 parts onion powder
0.85 parts red pepper
0.42 parts white pepper
0.30 parts black pepper
0.27 parts coriander Oat bran concentrate, potato starch and breadcrumb were mixed and soaked in water for 14 min. Spices and minced meat were added. Meat balls were formed on a steaking plate. The balls were baked in oven at 225° C. for 18 min.

In sensory evaluation after the baking, the meat balls were found to resemble in taste the industrially prepared meat balls on the Finnish market. The after-taste was spicy and strong, the consistency was soft. The mean weight after the baking was 16 g, the calculated content of β-glucan was 0.8%. Thus for receiving a dose of 0.75 g of β-glucan, 96 g corresponding to 6 meat balls should be eaten.

What is claimed is:

1. A method for preparing an oat product enriched in the content of β-glucan comprising:

dry milling dehulled or naked oat grain to disintegrate the oat grain and provide dry milled oat grains;

dry classifying the dry milled oat grains to provide a first fine fraction and a second coarse fraction, wherein the second coarse fraction has a higher content of β-glucan than the first fine fraction;

dry milling the second coarse fraction with a disintegrating action higher than that used when dry milling the dehulled or naked oat grain, to further disintegrate the second coarse fraction and provide a dry milled coarse fraction; and dry classifying the dry milled coarse fraction to provide a third fine fraction and an oat product enriched in the content of β-glucan, wherein each of the dry milling and dry classifying steps are carried out without a preceding step for removing fat.

2. The method of claim 1, wherein the content of β-glucan in the oat product enriched in the content of β-glucan is from 11 to 25 percent based on dry weight.

3. The method of claim 2, wherein the content of β-glucan in the oat product enriched in the content of β-glucan is from 12 to 19 percent based on dry weight.

4. The method of claim 1, wherein the dry milling is performed by roller milling or by impact milling.

5. The method of claim 1, wherein dry milling the dehulled or naked oat grain is performed by roller milling and dry milling the second coarse fraction is performed by impact milling.

6. The method of claim 1, wherein dry classifying is performed by sieving or air classification.

7. The method of claim 6, wherein dry classifying the dry milled oat grains is performed by sieving using a sieve with openings of between 100 and 300 μm.

8. The method of claim 7, wherein the sieve has openings of between 180 and 230 μm.

9. The method of claim 5, wherein dry classifying the dry milled oat grains is performed by air classification to provide a first fine fraction wherein at least 75% of the total volume of the first fine fraction has a particle size of less than 200 μm.

10. The method of claim 1, wherein the β-glucan content in the first fine fraction is less than 2.5% based on dry weight.

11. The method of claim 1, wherein dry classifying the dry milled coarse fraction is performed by sieving using a sieve with openings of between 90 and 250 μm.

12. The method of claim 11, wherein the sieve has openings of between 100 and 180 μm.

13. The method of claim 1, wherein dry classifying the dry milled coarse fraction is performed by air classification to provide a third fine fraction wherein at least 75% of the total volume of the third fine fraction has a particle size of less than 125 μm.

14. The method of claim 1, wherein the second coarse fraction has a lower moisture content than the dehulled or naked oat grains.

15. The method of claim 14, further comprising drying the second coarse fraction to a moisture content of less than 11%.

16. The method of claim 15, wherein the second coarse fraction is dried to a moisture content of between 8 and 10%.

17. The method of claim 1, further comprising flowing dry air across or through the dehulled or naked oat grain and/or the first coarse fraction when they are dry milled.

18. The method of claim 1, further comprising pearling the dehulled or naked oat grain before it is dry milled.

19. The method of claim 1, further comprising compressing or chaffing the dehulled or naked oat grain before it is dry milled.

20. A foodstuff comprising the oat product enriched in the content of β-glucan of claim 1.

21. The foodstuff of claim 20, wherein the foodstuff is a cereal, meat, ready-to-eat meal, drink, or candy product.

22. A method or preparing a foodstuff having a content of β-glucan comprising incorporating into the foodstuff the oat product enriched in β-glucan of claim 1.

23. The method of claim 22, wherein the foodstuff is a cereal, meat, ready-to-eat meal, drink, or candy product.

24. The method of claim 1, wherein there are no steps for removing fat performed at any point in the method.

* * * * *